(12) United States Patent
Kim et al.

(10) Patent No.: US 7,751,323 B2
(45) Date of Patent: Jul. 6, 2010

(54) METHOD AND APPARATUS FOR ADJUSTING UPLINK DATA RATE IN A MOBILE COMMUNICATION SYSTEM

(75) Inventors: Soeng-Hun Kim, Suwon-si (KR); Gert Jan Van Lieshout, Staines (GB); Hwan-Joon Kwon, Suwon-si (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 69 days.

(21) Appl. No.: 12/245,871

(22) Filed: Oct. 6, 2008

(65) Prior Publication Data

US 2009/0092202 A1    Apr. 9, 2009

(30) Foreign Application Priority Data

Oct. 5, 2007    (KR) ............... 10-2007-0100613
Jan. 16, 2008   (KR) ............... 10-2008-0005040
Mar. 31, 2008   (KR) ............... 10-2008-0030068

(51) Int. Cl.
*H04L 12/26* (2006.01)
*H04J 3/16* (2006.01)

(52) U.S. Cl. ............... 370/230; 370/252; 370/468
(58) Field of Classification Search ......... 370/229–235, 370/250–254, 468
See application file for complete search history.

(56) References Cited

U.S. PATENT DOCUMENTS

2007/0201369 A1    8/2007   Pedersen et al.

OTHER PUBLICATIONS

Mader, A., et al.; "Performance of Internet Services Over the UMTS Enhanced Uplink;" IEEE Computer Society; 2007 Int'l Conference on Next Generation Mobile Applications, Services and Technologies; Sep. 12-14, 2007.

*Primary Examiner*—Nittaya Juntima
*Assistant Examiner*—Samina Choudhry
(74) *Attorney, Agent, or Firm*—Cha & Reiter, LLC

(57) ABSTRACT

A method and UE apparatus are provided for adjusting an uplink data rate by a User Equipment (UE) in a mobile communication system. The method includes determining if a current state of a buffer is an empty state or a non-empty state; when the current buffer state is the non-empty state, comparing a ratio of a total of transmission data currently stored in the buffer to a total of Transport Formats (TFs) allocated during a predetermined number n of subframes, with a predetermined threshold; setting indication information indicating satisfaction/non-satisfaction ('happy bit(s)') of an uplink data rate according to the comparison result; and transmitting the set indication information to a Node B. The UE apparatus comprises a multiplexing/demultiplexing device, a HARQ processor, a controller to set information indicating satisfaction/non-satisfaction in accordance with pre-set rules, an exemplary set of which is also provided.

18 Claims, 13 Drawing Sheets

METHOD AND APPARATUS FOR ADJUSTING UPLINK DATA RATE IN A MOBILE COMMUNICATION SYSTEM

CLAIM OF PRIORITY

This application claims the benefit under 35 U.S.C. §119 (a) of a Korean Patent Application filed in the Korean Intellectual Property Office on Oct. 5, 2007 and assigned Serial No. 2007-100613, a Korean Patent Application filed in the Korean Intellectual Property Office on Jan. 16, 2008 and assigned Serial No. 2008-5040, and a Korean Patent Application filed in the Korean Intellectual Property Office on Mar. 31, 2008 and assigned Serial No. 2008-30068, the disclosures of which are incorporated herein by reference.

BACKGROUND OF THE INVENTION

The present invention relates generally to uplink data scheduling in a mobile communication system, and in particular, to a method and apparatus for adjusting a rate therein of uplink data.

Mobile communication systems have been developed with an aim to provide communication while guaranteeing mobility of users thereof. The mobile communication technology has been evolving to support not only the voice communication services but also the high-speed data communication services.

Recently, standardization work on Long Term Evolution (LTE), one of a plurality of next-generation mobile communication systems, is being conducted in a $3^{rd}$ Generation Partnership Project (3GPP). The LTE system is a technology for implementing high-speed packet-based communication at a rate of a maximum of about 100 Mbps, which is higher than that of the currently available data rate, aiming at its commercialization about 2010. To this end, several communication schemes are now under consideration, and they include a scheme of simplifying, for example, a configuration of the network, i.e., reducing the number of nodes located in the communication path, and a scheme of maximally approximating radio protocols to wireless channels.

Meanwhile, data service is determined according to the amount of desired transmission data, channel conditions, and allocable resources. A scheduler of the mobile communication system allocates transmission resources taking into account the amount of desired transmission data, channel conditions, and available wireless resources. Even the LTE system is expected to include a scheduler that will manage wireless resources in the same manner and the scheduler can be included in a Node B.

The mobile communication system is divided into downlink transmission and uplink transmission according to data transmission direction. The downlink transmission includes a transmission direction from a Node B to a User Equipment (UE), while the uplink transmission includes a transmission direction from a UE to a Node B. Regarding allocation of downlink wireless resources, the Node B can correctly detect channel conditions, the amount of resources, and the amount of transmission data. Therefore, the scheduler of the Node B can smoothly perform downlink scheduling. However, regarding allocation of uplink wireless resources, since the scheduler cannot correctly detect buffer status of UEs, it may have difficulty in performing correct scheduling for uplink transmission.

It is obvious that the mobile communication system needs a scheme for more accurate uplink scheduling. In this context, to smoothly perform uplink scheduling, a High Speed Uplink Packet Access (HSUPA)-based mobile communication system uses a scheme in which a UE transmits 1-bit information, called a 'happy bit', to a Node B, thereby adjusting its uplink data rate.

The 'happy bit', as used herein, means information indicating whether or not the UE is satisfied with the current data rate, and the scheduler of the Node B determines whether to allocate additional resources to the UE depending on the 'happy bit'. Particularly, in the HSUPA system, the 'happy bit' is transmitted over a separate uplink control channel associated with an uplink data transmission channel, and it is transmitted over an uplink control channel every time the UE transmits data on the uplink.

Even in the LTE system, UE's providing the 'happy bit' to the Node B would be advantageous to a scheduling operation. However, the current LTE system, unlike the HSUPA system, has no separate uplink control channel associated with the data transmission channel. In other words, the LTE system cannot transmit the 'happy bit', i.e., satisfaction/non-satisfaction of the uplink rate, using an uplink control channel, like the HSUPA system.

Therefore, there is a need for a detailed scheme regarding how to transmit and check satisfaction/non-satisfaction of the uplink data rate in the LTE system. That is, there is a need for a detailed scenario regarding how to perform uplink data scheduling in the LTE system.

SUMMARY OF THE INVENTION

The present invention addresses at least these problems and/or disadvantages and to provide at least the advantages described below. Accordingly, the present invention provides a method and apparatus for performing uplink data scheduling in a mobile communication system.

The present invention provides a method and apparatus in which a UE transmits information for adjusting an uplink data rate to a Node B in a mobile communication system.

The present invention provides a method and apparatus in which a UE sets information for adjusting an uplink data rate in a mobile communication system that has no separate uplink control channel transmitted along with an uplink data channel.

The present invention provides a method and apparatus in which a UE issues a request for uplink data scheduling in a mobile communication system that has no separate uplink control channel transmitted together with an uplink data channel.

The present invention provides a method and apparatus in which a Node B receives scheduling information from a UE and performs uplink data scheduling depending thereon in a mobile communication system.

The present invention provides a method for adjusting an uplink data rate by a User Equipment (UE) in a mobile communication system. The method includes determining if a current state of a buffer is an empty state or a non-empty state; when the current buffer state is the non-empty state, comparing a ratio of a total of transmission data currently stored in the buffer to a total of Transport Formats (TFs) allocated during a predetermined number n of subframes, with a predetermined threshold; setting indication information indicating satisfaction/non-satisfaction of an uplink data rate according to the comparison result; and transmitting the set indication information to a Node B.

The present invention provides a User Equipment (UE) apparatus for adjusting an uplink data rate in a mobile communication system. The apparatus includes a controller for determining if a current state of a buffer is an empty state or a non-empty state, comparing, when the current buffer state is the non-empty state, a ratio of a total of transmission data currently stored in the buffer to a total of Transport Formats (TFs) allocated during a predetermined number n of subframes, with a predetermined threshold, and setting indication information indicating satisfaction/non-satisfaction of an uplink data rate according to the comparison result; and a transceiver for transmitting the set indication information to a Node B.

BRIEF DESCRIPTION OF THE DRAWINGS

The above and other features and advantages of the present invention will become more apparent from the following detailed description when taken in conjunction with the accompanying drawings in which.

DETAILED DESCRIPTION OF THE INVENTION

Preferred embodiments of the present invention will now be described in detail with reference to the annexed drawings. For the purposes of simplicity, a detailed description of known functions and configurations incorporated herein has been omitted for clarity and conciseness. Terms used herein are defined based on functions in the present invention and may vary according to users, operators' intention or usual practices. Therefore, the definition of the terms should be made based on contents throughout the specification.

A description will now be made of an example of an LTE system to which the present invention is applicable.

In the currently proposed LTE system, a Node B allocates uplink transmission resources. For Node B's scheduling, a UE first reports its buffer state in a buffer state report. Since even the buffer state reporting needs uplink transmission resources, the UE needs to transmit simple information requesting allocation of transmission resources for the buffer state reporting. To this end, the LTE system uses a scheduling request, and the scheduling request is composed of 1 bit. The scheduling request is transmitted over a Scheduling Request Channel (SRCH), which is a periodic transmission resource previously allocated to UEs.

The buffer state report includes control information by which a UE reports its detailed buffer state to a Node B, and, for example, information such as the amount of data stored in the buffer and priority is included in the buffer state report. If a Node B does not know the fact that a UE has data to transmit, there is no possibility that the Node B will allocate transmission resources to the UE. Thus, in order to transmit the buffer state report, the UE first transmits a scheduling request. On the other hand, if a Node B knows the fact that a UE has data to transmit, the Node B will allocate transmission resources to the UE in a short time, so that there is no need for the UE to transmit a scheduling request in order to transmit the buffer state report. In other words, the UE can transmit information other than the scheduling request (SR) using the SRCH.

The present invention defines the state in which a Node B determines that a UE has data to transmit, as a 'non-empty state' where the buffer is not empty, and defines the state in which a Node B determines that a UE has no data to transmit, as an 'empty state' where the buffer is empty.

Therefore, according to the teachings of the present invention, a UE transmits the scheduling request over SRCH in the empty state, and transmits, in the non-empty state, information indicating its satisfaction/non-satisfaction of the current uplink data rate, over SRCH. The information indicating satisfaction/non-satisfaction of the current uplink data rate will be referred to herein as a 'happy bit'.

Figure 1:
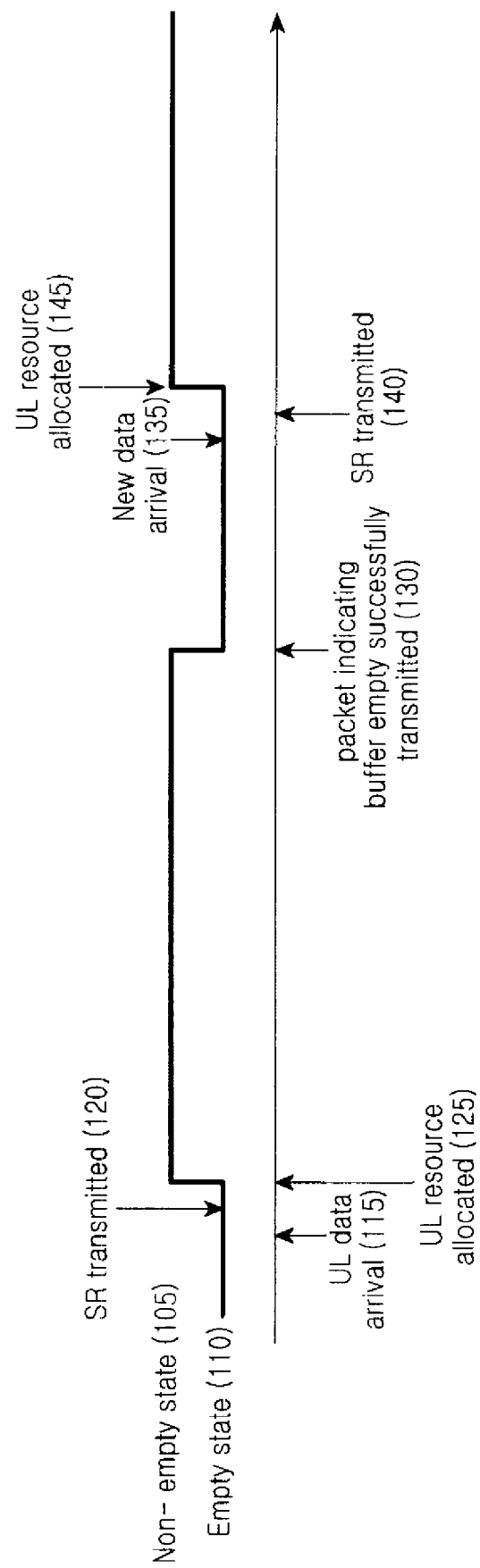
FIG. 1 is a diagram illustrating an example of an empty state and a non-empty state of a buffer, according to an exemplary embodiment of the present invention.

With reference to FIG. 1, a description will now be made of a process in which a UE and a Node B transition between an empty state and a non-empty state, according to an exemplary embodiment of the present invention.

Referring to FIG. 1, at first, since there is no uplink data in a UE and a Node B determines that there is no uplink data in the UE, the UE and the Node B both start at the empty state 110.

If uplink data occurs in the UE at an arbitrary time (115), the UE transmits a scheduling request over SRCH (120). When the scheduling request is delivered to the Node B, the Node B allocates transmission resources to the UE (125). Since the Node B's allocation of transmission resources to the UE means that the Node B has recognized the existence of uplink data in the UE, the Node B makes a transition of the UE's state from the empty state to the non-empty state. The non-empty state lasts until the UE notifies the Node B that it has no data to transmit.

The UE informs the Node B that it has no more data to transmit, by transmitting an explicit signal to the Node B, for example, transmitting to the Node B a buffer state report indicating that the amount of data stored in the buffer is 0, or by transmitting padding, or meaningless information, over the allocated transmission resources. If the UE successfully transmits a packet with the information indicating that there is no more data to transmit (130), the Node B makes a transition of the UE's state from the non-empty state to the empty state. The foregoing process is repeated every time new uplink data occurs in the UE.

In summary, if the UE, initially starting at the empty state, is allocated uplink transmission resources as it has data to transmit on the uplink, the UE transitions to the non-empty state, and if the UE successfully transmits a packet with information indicating that there is no more data to transmit, the UE transitions to the empty state.

Figure 2:
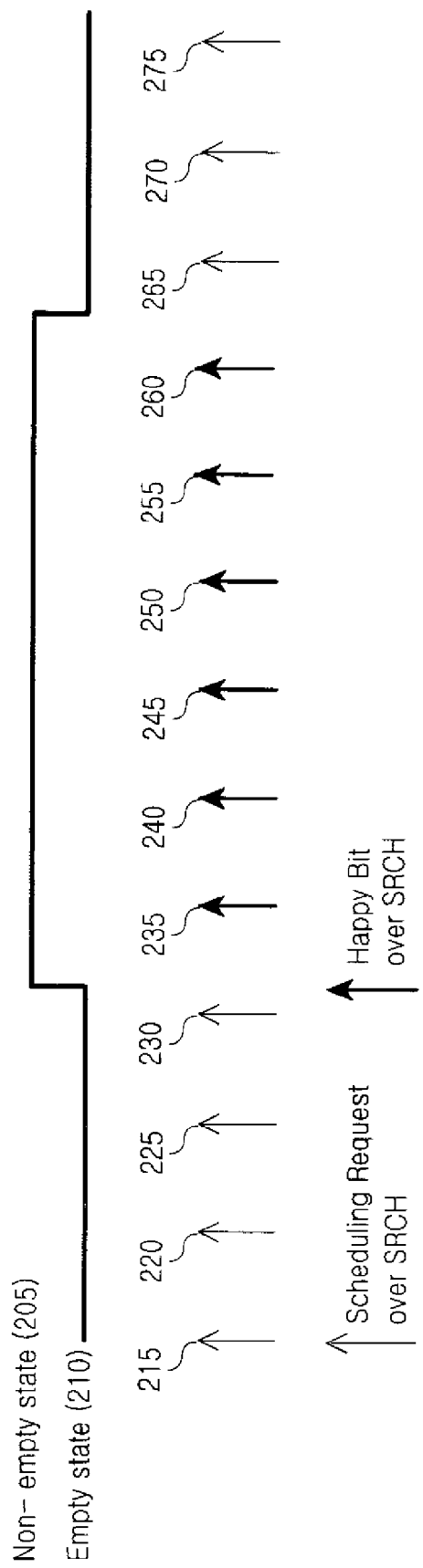
FIG. 2 is a diagram illustrating an example of transmitting information indicating satisfaction/non-satisfaction of an uplink data rate according to an exemplary embodiment of the present invention.

FIG. 2 is a diagram illustrating an example of transmitting information indicating satisfaction/non-satisfaction of an uplink data rate according to an exemplary embodiment of the present invention.

Referring to FIG. 2, in the empty state 210, a UE transmits a scheduling request over periodically allocated SRCH (215, 220, 225, 230, 265, 270 and 275). In the non-empty state 205, the UE transmits a 'happy bit' over periodically allocated SRCH (235, 240, 245, 250, 255 and 260). The 'happy bit' is information indicating whether or not the UE is satisfied with a current data rate.

In HSUPA, since data is also transmitted together at the time the 'happy bit' is transmitted, it is possible to determine satisfaction/non-satisfaction of the current data rate by calculating a data rate from a size of the associated data. However, in the LTE system, since the 'happy bit' transmission time and the uplink packet transmission time are not always coincident with one another, a definition of the current data rate is vague, so that it is uncertain as to which rule the UE will use in setting the 'happy bit'.

First, the 'happy bit' has the following meanings.

0: The UE is satisfied (happy) with the current data rate.

1: The UE is unsatisfied (unhappy) with the current data rate. That is, the UE requests the Node B to allocate more transmission resources.

The present invention includes three example embodiments for transmitting the 'happy bit' over SRCH.

Figure 3:
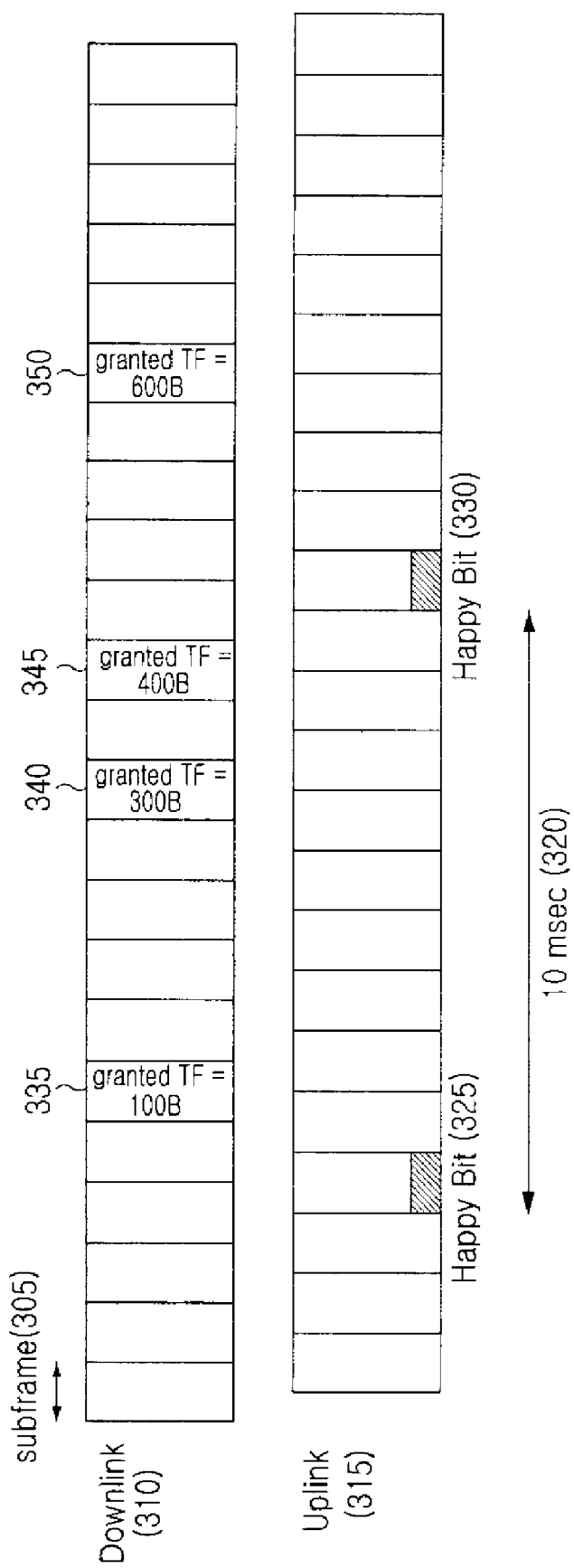
FIG. 3 is a diagram illustrating an example of setting a 'happy bit' according to a first exemplary embodiment of the present invention.

FIG. 3 is a diagram illustrating a first example embodiment of setting a happy bit according to the present invention.

Happy Bit Setting Rule 1

When the total of data currently stored in the buffer is defined as A and the total of Transport Formats (TFs) allocated during the past n subframes is defined as B. Rule 1 sets the 'happy bit' to 0 for A/B>C, and otherwise, sets the 'happy bit' to 1.

Here, C is a predetermined particular value, i.e., a threshold used for setting the 'happy bit' to 0 or 1. More specifically, in the case where the same data rate as an average data rate during the past n subframes is maintained, if it is possible to transmit all the data currently stored in the buffer during C×n subframes, the UE is satisfied, i.e., happy, with the current uplink data rate. Otherwise, the UE is unsatisfied, i.e., not happy, with the current uplink data rate.

Meanwhile, a Node B allocates uplink transmission resources subframe by subframe, and one packet is transmitted over one subframe. Herein, the subframe, the unit time for which a packet is transmitted/received, is 1 msec. The Node B not only allocates the transmission resources to UEs, but also designates a size of the packet that the UEs will transmit using the transmission resources. Therefore, the 'total of TFs allocated during n subframes' means the total size of the packet transmitted during the past n subframes, i.e., an average data rate. Thus, the Node B can select an appropriate value n in view of the service provider's network operation policy or operation experiences. For example, the Node B can use a period of SRCH as the value n. That is, if SRCH is allocated at periods of 10 msec, the value n can be set to 10.

In 'Happy Bit Setting Rule 1', the UE, in setting a 'happy bit' 330, calculates the total of TFs allocated during the past n subframes, e.g., the past 10 subframes. The total value of TFs is 800 bytes. Further, the UE calculates the total of data stored in the buffer at the time it sets the 'happy bit'. The total A of the buffer's data is, for example, 2000 bytes, and C is 4.

Therefore, a value obtained by dividing the total of data stored in the buffer by the total of TFs allocated during the past 10 subframes is 2.5, which is less than 4. Thus, the UE sets the 'happy bit' to 0. For example, if C is set to 2, the UE sets the 'happy bit' to 1, requesting the Node B to allocate more transmission resources.

Happy Bit Setting Rule 2

When the total of data currently stored in the buffer is defined as A1 and a size of the just previously allocated TF (i.e., the last allocated TF) is defined as B1, Rule 2 sets the 'happy bit' to 0 for A1/B1>C1, and otherwise, sets the 'happy bit' to 1.

The TF used as a criterion for the 'happy bit' setting is limited to the TF for which a maximum of n1 msec has not elapsed after it is allocated. If no transmission resource has been allocated within the n1 msec, B1 is regarded as 0. By defining a denominator of the 'happy bit' calculation as the just previous TF in this manner, the UE memorizes only the just previously allocated TF, without continuously memorizing the TFs allocated in the past, thereby reducing its complexity. For C1 and n1, proper values are selected in view of the service provider's network operation policy or operation experiences.

In 'Happy Bit Setting Rule 2', the UE, in setting a 'happy bit' 330, compares C1 with a value obtained by dividing the total, e.g., 2000 bytes, of data stored in the buffer at the time it sets the 'happy bit' by TF=400 bytes which are last allocated, to determine whether it will set the 'happy bit' to 0 or 1.

Happy Bit Setting Rule 3

In setting the 'happy bit', the UE considers not all the data stored in the buffer, but the amount of data which will be discarded unless it is transmitted within a predetermined number n2 of next subframes.

The data stored in the UE's buffer is discarded unless it is transmitted within a specific period determined according to Quality of Service (QoS). This is to prevent a transmission resource waste, which may occur as ineffective data is transmitted because it is not transmitted within the specific period, and buffer overflow, which may occur as data is stored in the buffer for an excessively long period.

For convenience, it will be assumed herein that when data is stored in the buffer, a discard timer is started, and when the discard timer expires, the data is discarded.

In 'Happy Bit Setting Rule 3', when the amount of data which will be discarded unless it is transmitted within the next N2 subframes, in the data currently stored in the buffer, is defined as A2, and the total of TFs allocated during the previous n2 subframes is defined as B2, the UE sets the 'happy bit' to 0 for A2/B2>C2, and otherwise sets the 'happy bit' to 1. For A2/B2=1, it means that if the UE is allocated, during the next n2 subframes, the same amount of transmission resources as that allocated during the previous n2 subframes, the UE can transmit the data without discarding it. Therefore, even though Rule 3 only needs to set C2 to 1 in the ideal case, it is also possible to set C2 to a value slightly less than 1 in case that the amount of transmission resources to be allocated during the next n2 subframes is less than that allocated during the previous n2 subframes.

Figure 4:
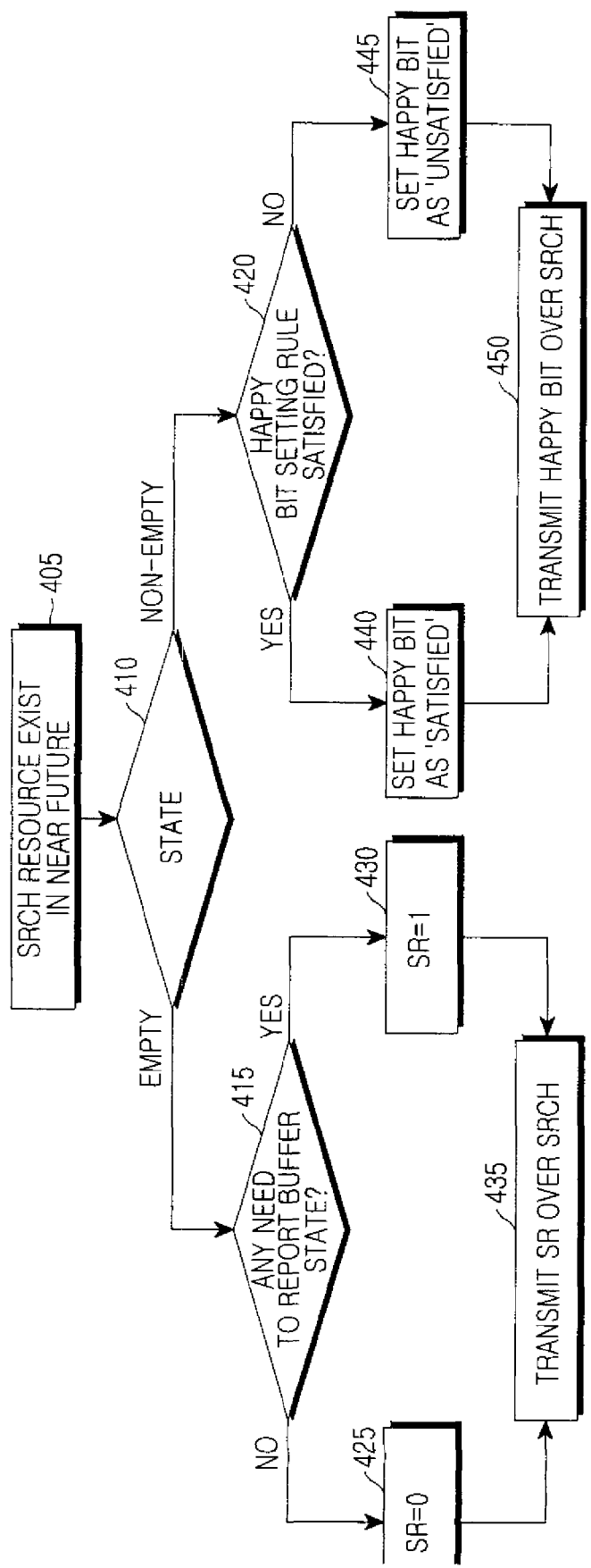
FIG. 4 is a flowchart illustrating an example of a UE's operation according to the first exemplary embodiment of the present invention.

FIG. 4 is a flowchart illustrating an example of the UE's operation according to the first embodiment of the present invention.

Referring to FIG. 4, in step 405, the UE perceives the existence of SRCH transmission resources. Herein, the UE has already been allocated SRCH transmission resources through a call setup process and the like. The SRCH transmission resources are periodic uplink transmission resources, and the UE transmits scheduling request information in which the UE's buffer state is reflected, or information indicating satisfaction/non-satisfaction of the uplink data rate, to a Node B using the allocated SRCH transmission resources according to the present invention.

In step 410, the UE checks if the current buffer state is an empty state or a non-empty state. If the current buffer state is the empty state, the UE proceeds to step 415, and if the current buffer state is the non-empty state, the UE proceeds to step 420. In step 415, the UE determines scheduling request information according to a normal procedure. That is, if there is a need to report the buffer state, the UE proceeds to step 430 where it sets the scheduling request information to 1. If there is no need to report the buffer state, the UE proceeds to step 425 where it sets the scheduling request information to 0. Thereafter, in step 435, the UE transmits the set scheduling request information over SRCH.

In step 420, the UE determines a 'happy bit' it will transmit over the SRCH transmission resources. For example, the UE applies one of exemplary Happy Bit Setting Rules 1, 2 and 3 according to the present invention, and according to the results, proceeds to step 440 where the UE sets the 'happy bit' to a value indicating that it is satisfied with the current transmission resource allocation, or proceeds to step 445 where the UE sets the 'happy bit' to a value indicating that it is unsatisfied with the current transmission resource allocation.

In exemplary Happy Bit Setting Rule 1, A indicates the total of data currently stored in the buffer, and B indicates the total of TFs allocated during the past n subframes. C is a threshold parameter that a Node B allocates to a UE in the call setup process. As for C and n, the Node B signals them to the UE in the initial call setup process. Exemplary Happy Bit Setting Rule 1 means that in the case where a transmission resource allocation trend during the past n subframes is applied intact in the future, if all the data stored in the UE's buffer can be transmitted within the next C×n subframes, the UE is satisfied with the current transmission resource allocation trend, and otherwise, unsatisfied with the current transmission resource allocation trend.

In exemplary Happy Bit Setting Rule 2, A1 indicates the total of data currently stored in the buffer, B1 indicates a size of the last allocated TF, and C1 indicates a threshold parameter that a Node B signals to a UE in the call setup process. Exemplary Happy Bit Setting Rule 2 means that in the case where the last allocated TF is allocated for every subframe, if all the data stored in the UE's buffer is transmitted within the next C1 subframes, the UE is satisfied with the current transmission resource allocation trend, and otherwise, unsatisfied with the current transmission resource allocation trend.

Finally, in exemplary Happy Bit Setting Rule 3, A2 indicates the amount of data which will be discarded unless it is transmitted within the next n2 subframes, in the data currently stored in the buffer, B2 indicates the total of TFs allocated during the previous n2 subframes, and C2 indicates a threshold parameter that a Node B signals to a UE in the call setup process. Exemplary Happy Bit Setting Rule 3 means that in the case where a transmission resource allocation trend during the past n2 subframes is applied intact in the future, if all the data which might be discarded can be transmitted within the next C2×n2 subframes, the UE is satisfied with the current transmission resource allocation trend, and otherwise, unsatisfied with current transmission resource allocation trend.

In step 450, the UE transmits the set happy bit over SRCH.

When 1-bit information of SR or 'happy bit' is transmitted over SRCH, the 1-bit information can be transmitted after undergoing modulation (e.g., On/Off Keying).

A second exemplary embodiment of the present invention provides a method for transmitting the 'happy bit' after including said 'happy bit' in a header of a packet.

Figure 5:
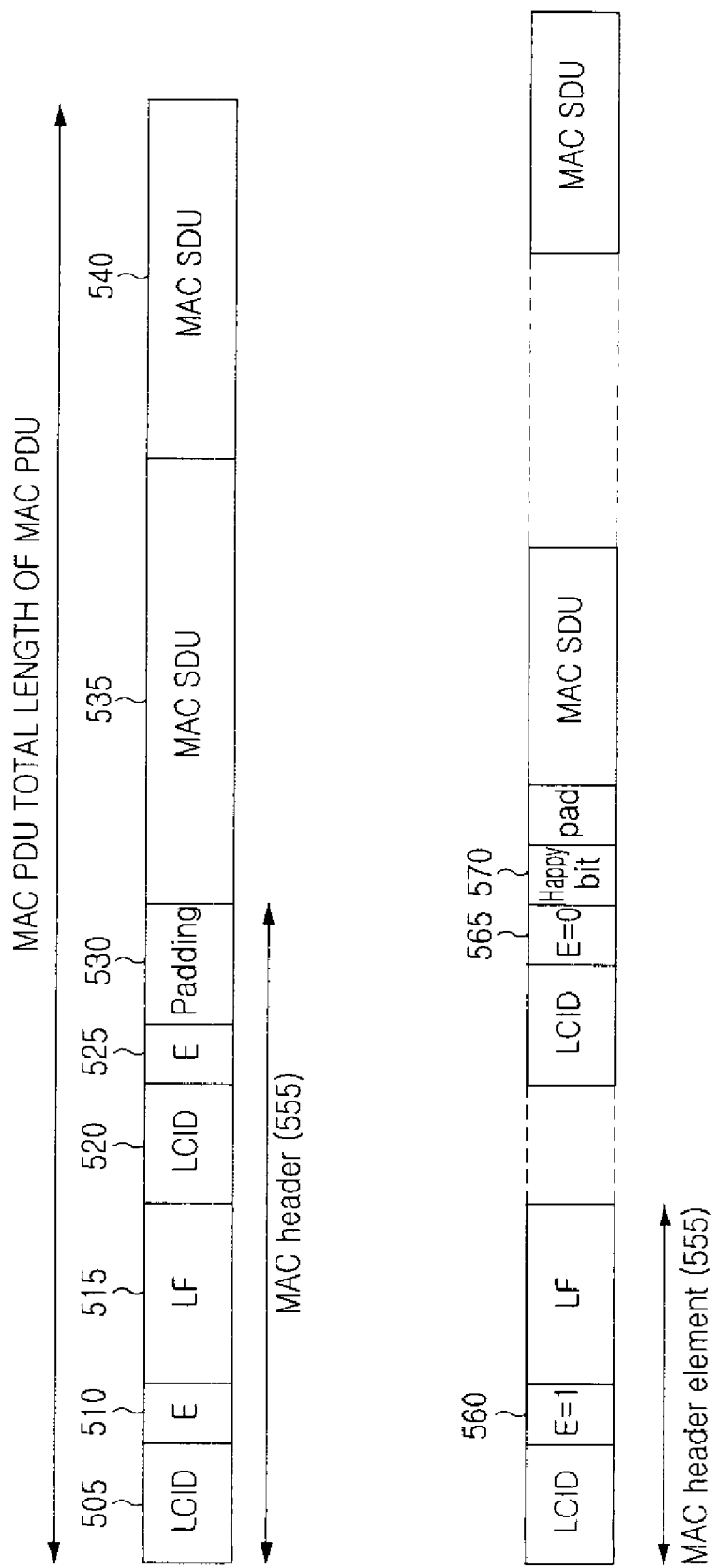
FIG. 5 is a diagram illustrating a transmission structure of a MAC header having a 'happy bit' field according to a second exemplary embodiment of the present invention.

FIG. 5 is a diagram illustrating an example of a transmission structure of a Medium Access Control (MAC) header having a 'happy bit' field, according to the second exemplary embodiment of the present invention.

Referring to FIG. 5, a packet transmitted/received over a wireless channel is called a MAC Protocol Data Unit (PDU), and the MAC PDU is made by multiplexing a plurality of MAC Service Data Units (SDUs).

A MAC header 550 comprises Logical Channel Identifiers (LCIDs) 505 and 520, which are information on upper layers of multiplexed MAC SDUs; Elements (Es) 510 and 525, which are information indicating boundaries between the MAC header 550 and MAC SDUs 535 and 540; and a Length Field (LF) 515, which is information on sizes of the MAC SDUs 535 and 540. LCID, E and LF are provided for every MAC SDU on a one-to-one basis. That is, the MAC header 550 can be a set of a plurality of MAC header elements 555.

Exceptionally, however, there is no LF for the last MAC SDU for the following reason. That is, since the total length of the MAC PDU is one-to-one associated with the TF that the scheduler allocates, e.g., since the TF indicates the total length of the MAC PDU, a size of the last MAC SDU can be calculated from the total size of the MAC PDU and the total size of the other MAC SDUs.

The following are sizes of MAC header fields now under discussion.

LCID=5 bits, E=1 bit, LF=10 or 18 bits

In order to reduce a processing load of the MAC header, it is efficient that the MAC header 550 is byte-aligned, and LCID, E and LF are also byte-aligned together. Since there is no LF for the last MAC SDU, as stated above, padding is added to a rear part of an F-bit 565. According to the present invention, if LCID is assumed to have 5 bits, there is 2-bit padding. In other words the present invention sets, as a 'happy bit', the padding part which is added to the rear part of an E-bit for the last MAC SDU. For the 2-bit padding, one of the first bit or the second bit is used as the 'happy bit', and the remaining one bit is used for padding or another purpose.

E-bits 560 and 565 each indicate whether or not the corresponding MAC header element 555 is the last one, and if it is the last MAC header element, the 'happy bit' and the padding bit are contained in place of the LF field. The E-bit 565 is set to 0, notifying the reception side that the 'happy bit' 570 is situated in a predetermined one of the next bits of the E-bit 565.

When the UE transmits the 'happy bit' after including it in the MAC header according to the second exemplary embodiment of the present invention, the 'happy bit' and the MAC PDU are transmitted together, so that the 'happy bit' value which was set at the time the UE transmitted the MAC PDU, is no longer valid at the time the transmission of the MAC PDU is completed. This is because a delay of a predetermined period is accompanied with the MAC PDU transmission.

When the time required until an arbitrary packet succeeds in its transmission after undergoing a Hybrid Automatic Repeat reQuest (HARQ) process is defined as an HARQ delay, the HARQ delay of a particular packet varies in its size according to the number of HARQ retransmissions for the corresponding packet, and it is subject to change according to channel conditions. For example, an HARQ delay of a UE in a good channel condition has a smaller value on average, and an HARQ delay of a UE in a poor channel condition has a greater value on average. There is a time difference corresponding to the HARQ delay between the time the UE sets the 'happy bit' and the time the 'happy bit' is delivered to the Node B, and the meaning of the 'happy bit' may be distorted due to the time difference.

For example, assume that the UE sets the 'happy bit' as 'unsatisfied' and transmits a MAC PDU at time t1, and the Node B has successfully received the MAC PDU at time t2. In this case, transmission resources can be allocated to the UE several times in the period between t2 and t1. In this case, even though the UE can be satisfied with the current data rate at time t2, the Node B, which has received the 'happy bit' which was transmitted after being set as 'unsatisfied' at time t1, may determine that the UE is unsatisfied with the data rate at the present time, i.e., at time t2, when the UE actually is satisfied with the then current data rate. That is, there is a possible distortion of the 'happy bit' due to the time difference between the time the UE actually sets the 'happy bit' and the time the 'happy bit' is received at the Node B.

Therefore, the second exemplary embodiment of the present invention intends to minimize occurrence of the distortion by changing meanings of the parameters which are considered for 'happy bit' setting. The second exemplary embodiment of the present invention uses, as a 'happy bit' setting criterion, an average data rate during a longer time, other than an instantaneous data rate calculated from the size of the MAC PDU transmitted together with the 'happy bit'.

Happy Bit Setting Rule 4, to be used in the second exemplary embodiment of the present invention, is similar to Happy Bit Setting Rule 1, and it can be regarded as a subset of Happy Bit Setting Rule 1.

When the total of data currently stored in the buffer is defined as A, and the total of TFs allocated during past n subframes is defined as B, Happy Bit Setting Rule 4 sets the 'happy bit' to 0 (satisfied) for A/B>(C+1), and otherwise, sets the 'happy bit' to 1 (unsatisfied).

When an average HARQ delay is used as the value n, B means the total size of the packet transmitted during the past HARQ delay. The 'happy bit', which is set at the present time, will be delivered to the Node B after a lapse of the HARQ delay for a MAC PDU containing the 'happy bit'. If the past transmission resource allocation trend is kept intact even in the near future, a packet corresponding to B will be further transmitted during the HARQ delay.

Figure 6:
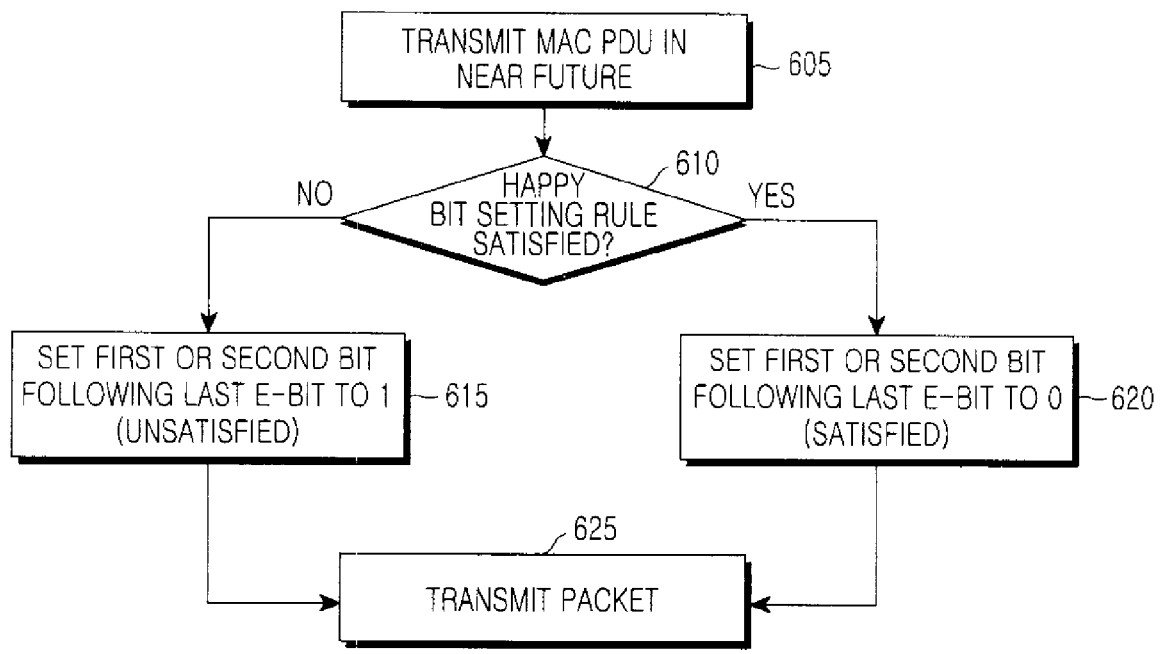
FIG. 6 is a control flowchart illustrating an example of an operation of transmitting a packet by a UE according to the second exemplary embodiment of the present invention.

FIG. 6 is a control flowchart illustrating an operation of transmitting a packet by a UE according to the second exemplary embodiment of the present invention.

Referring to FIG. 6, in step 605, the UE is allocated transmission resources from a Node B, and perceives that transmission of a MAC PDU is possible. In step 610, the UE checks a 'happy bit' setting rule. Herein, the UE has already received parameters n and C which will be applied for 'happy bit' setting, through a call setup process. The value n can be replaced with an average HARQ delay during a predetermined period (past×packet transmissions), in an alternative exemplary embodiment of the present invention.

Therefore, the UE checks if a ratio of the total of data stored in the buffer at the corresponding time to the total of TFs allocated during the past n subframes is greater than a predetermined parameter C. If the set rule is satisfied, the UE proceeds to step 620 to set the 'happy bit' as 'satisfied', and if the set rule is unsatisfied, the UE proceeds to step 615 to set the 'happy bit' as 'unsatisfied'.

In step 615, the UE sets, to 1, one (i.e., happy bit field) of the first bit and the second bit following the last E-bit of a MAC PDU header to be transmitted, and then proceeds to step 625. In step 620, the UE sets the 'happy bit' field of the MAC PDU header to 0, and then proceeds to step 625. Herein, determining whether it will define, as the 'happy bit', the first bit or the second bit following the last E-bit, or another bit, will be made in the protocol design process. For example, the present invention considers the case where one of the first bit and the second bit is used as the 'happy bit'.

In step 625, the UE transmits a packet including the set 'happy bit' to the Node B.

A third exemplary embodiment of the present invention provides a method for transmitting two 'happy bits' after including the two 'happy bits' in a header of a packet.

The third exemplary embodiment of the present invention uses, as 'happy bits', both of the two unused bits following the last E-bit. The two bits can use four code points, and of course, the two-bit 'happy bit' field can provide more accurate information compared with the one-bit 'happy bit' field. For convenience, the total of data currently stored in the UE's buffer will be called Total Buffer Size (TBS), and the size of a MAC PDU expected to contain the 'happy bits' will be called TF_current. A description will now be made of an example of setting a two-bit 'happy bit' field using the TBS and the TF_current.

| Happy Bit Setting Rule 5 | |
|---|---|
| Happy bit | Setting Rule |
| 0 | TBS/TF_current < m0 |
| 1 | m0 ≦ TBS/TF_current < m1 |
| 2 | m1 ≦ TBS/TF_current < m2 |
| 3 | m2 ≦ TBS/TF_current |

A UE finds a ratio of the total of data currently stored in the buffer to the size of a MAC PDU scheduled to contain the 'happy bits', and compares the ratio with predetermined integers m0, m1 and m2, to determine a value of the 'happy bits'. Depending on the reported 'happy bits', a Node B can determine the approximate amount of data stored in the UE's buffer at the time the UE sets the 'happy bits'.

For example, if the number of 'happy bits' is set to 2, and m1 and m2 are 10 and 15, respectively, the Node B can estimate that the UE's buffer state at the time the UE sets the 'happy bits', ranges between the value obtained by multiplying TF_current by 15 and the value obtained by multiplying TF_current by 10. In addition, the Node B can estimate that the UE's buffer state at the time the Node B received the 'happy bits', is a value obtained by subtracting the sum of TFs allocated for a period between the time that the Node B received the 'happy bits' and the time that the UE set the 'happy bits', from the UE's buffer state at the time the UE set the 'happy bits'. By signaling the two-bit 'happy bit' field in this manner, the Node B can finely determine the UE's buffer state.

Meanwhile, it is also possible to set the 'happy bit' setting rule in association with the last reported buffer state rather than TF_current. For convenience, the total amount of data reported as the UE stores it, in the last transmitted buffer state report, is called Buffer_Size_Reported.

For example, if the last transmitted buffer state report indicates that 1000-byte data is stored in the first buffer and 10000-byte data is stored in the second buffer, Buffer_Size_Reported is 11000 bytes.

Happy Bit Setting Rule 6

| Happy bit | Setting Rule |
|---|---|
| 0 | Buffer_Size_Reported/TBS < P0 |
| 1 | P0 ≤ Buffer_Size_Reported/TBS < P1 |
| 2 | P1 ≤ Buffer_Size_Reported/TBS < P2 |
| 3 | P2 ≤ TBS/TF_current |

In Happy Bit Setting Rule 6, the 'happy bits' mean a ratio of the total of the last reported buffer size to the total of data currently stored in the buffer, and the Node B estimates from the ratio the total of data stored in the buffer at the time the UE set the 'happy bits'.

Figure 7:
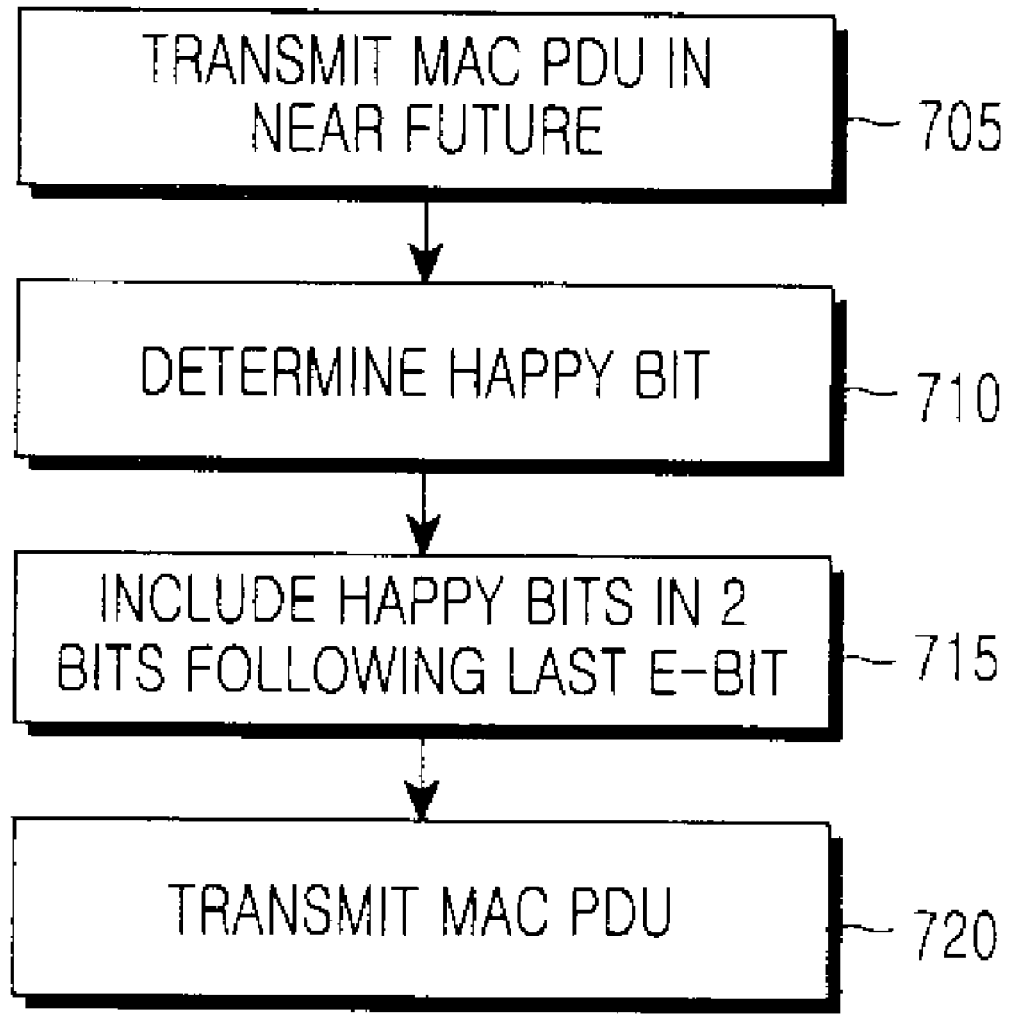
FIG. 7 is a control flowchart illustrating an example of an operation of transmitting a packet by a UE according to a third exemplary embodiment of the present invention.

FIG. 7 is a control flowchart illustrating an operation of transmitting a packet by a UE according to the third exemplary embodiment of the present invention.

Referring to FIG. 7, in step 705, the UE is allocated transmission resources from a Node B, and perceives that MAC PDU transmission is possible. In step 710, the UE determines a value of 'happy bits' using Happy Bit Setting Rule 5. Herein, the UE has already received m0, m1 and m2, or p0, p1 and p2, which are parameters to be applied for happy bit setting, in the call setup process. When using Happy Bit Setting Rule 5, the UE finds a ratio of the size TF_current of a MAC PDU to be transmitted, to the total TBS of data currently stored in the UE's buffer, and determines 'happy bits' using a relation between the ratio and m0, m1 and m2. That is, the UE determines the value of 'happy bits' as 0 for ratio<m0, determines the 'happy bits' value as 1 for m0<ratio<m1, determines the 'happy bits' value as 2 for m1<ratio<m2, and determines the 'happy bits' value as 3 for ratio>m2.

However, when using Happy Bit Setting Rule 6, the UE finds a ratio of the total TBS of data currently stored in its buffer to the total Buffer_Size_Reported of data reported as the UE stores it, in the last transmitted buffer state report, and determines the 'happy bits' using a relation between the ratio and p0, p1 and p2. That is, the UE determines the 'happy bits' value as 0 for ratio<p0, determines the 'happy bits' value as 1 for p0<ratio<p1, determines the 'happy bits' value as 2 for p1<ratio<p2, and determines the 'happy bits' value as 3 for ratio>p2. In step 715, the UE includes the determined 'happy bits' in the 'happy bit' field.

In other words, the UE determines as a 'happy bit' field the next 2 bits of the last E-bit in a MAC header of a MAC PDU to be transmitted, and includes the 'happy bits' determined in step 710, in the 'happy bit' field. In step 720, the UE transmits the MAC PDU.

Figure 8:
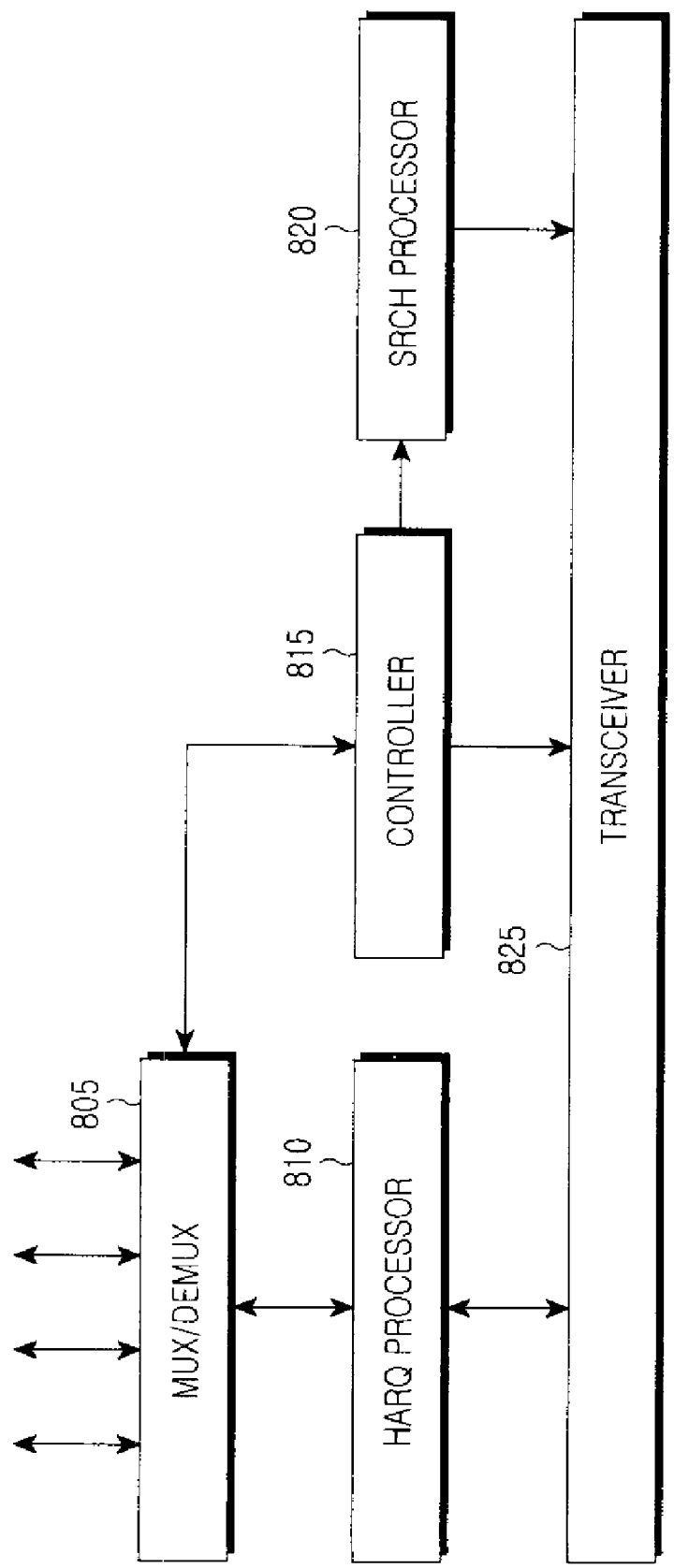
FIG. 8 is a block diagram of an example of a UE apparatus according to an exemplary embodiment of the present invention.

FIG. 8 is a block diagram of an exemplary UE apparatus according to an embodiment of the present invention.

Referring to FIG. 8, the UE includes a multiplexing/demultiplexing device 805, a HARQ processor 810, a controller 815 to set information indicating satisfaction/non-satisfaction of the current uplink data rate, an SRCH processor 820, and a transceiver 825.

Herein, the controller 815 is called a 'happy bit' controller 815, and determines 'happy bit(s)' to be transmitted at an arbitrary time considering the UE's buffer state, by applying one of the above-stated exemplary Happy Bit Setting Rules 1 to 6.

According to the first exemplary embodiment of the present invention, the 'happy bit' controller 815 determines if the current UE's buffer state is an empty state or a non-empty state. If the current UE's buffer state is the non-empty state, the UE determines the 'happy bit' using one of Happy Bit Setting Rules 1, 2 and 3.

According to the second exemplary embodiment of the present invention, the happy bit controller 815 determines the 'happy bit' to be contained in a MAC PDU using Happy Bit Setting Rule 4, before transmission of the MAC PDU. The 'happy bit' controller 815 provides the set 'happy bit' to the multiplexing/demultiplexing device 805. The multiplexing/demultiplexing device 805 receives MAC SDUs from an upper layer device, multiplexes them into a MAC PDU, and generates a MAC PDU header. Herein, the multiplexing/demultiplexing device 805 includes the set 'happy bit' in one of the first bit and the second bit following an E-bit in the last MAC header element of the MAC PDU header.

According to the third exemplary embodiment of the present invention, the 'happy bit' controller 815 determines 'happy bits' scheduled to be contained in a MAC PDU using one of Happy Bit Setting Rule 5 and Happy Bit Setting Rule 6, before transmission of the MAC PDU. Thereafter, the 'happy bit' controller 815 provides the 'happy bits' to the multiplexing/demultiplexing device 805. The multiplexing/demultiplexing device 805 receives MAC SDUs from the upper layer device, multiplexes them into a MAC PDU, and generates the MAC PDU header. Further, the multiplexing/demultiplexing device 805 includes the set 'happy bits' in the 2 bits following the E-bit in the last MAC header element of the MAC PDU header.

Herein, the 'happy bit' controller 815 determines the 'happy bits' considering an HARQ delay, i.e., considering packets that undergo an HARQ operation by means of the HARQ processor 810 according to an embodiment of the present invention.

Further, the 'happy bit' controller 815 provides the determined happy bits to the SRCH processor 820. The SRCH processor 820 controls the transceiver 825 to transmit the 'happy bits' using specific transmission resource at a predetermined time.

The transceiver 825 transmits/receives a MAC PDU with 'happy bit(s)' or SRCH with 'happy bit' and scheduling request information over a wireless channel according to an embodiment of the present invention.

The HARQ processor 810 is a set of soft buffers formed to perform an HARQ operation, and is identified by an HARQ process identifier.

A fourth exemplary embodiment of the present invention provides a method for transmitting a 'happy bit' after including it in the first MAC header element. In the present invention, LF can be defined with 10 bits, 18 bits, or another value. In this case, padding bits may occur for each of multiple MAC header elements constituting a MAC header.

Figure 9:
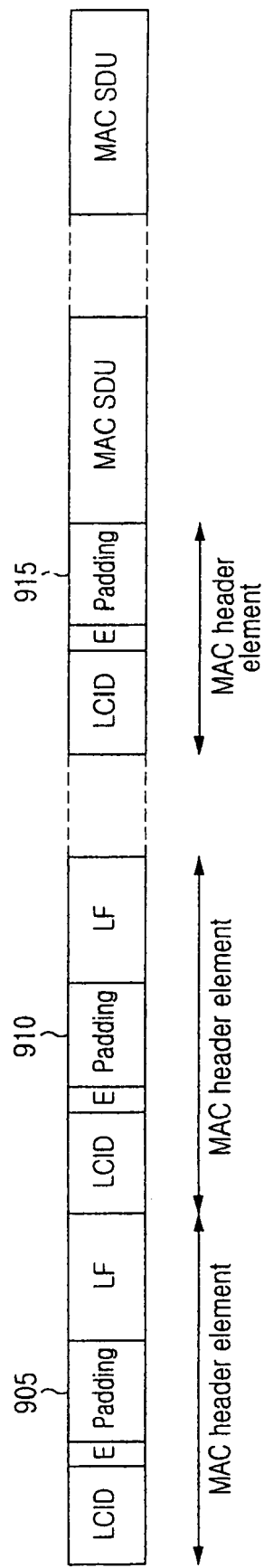
FIG. 9 is a diagram illustrating an example of a MAC PDU structure newly defined according to an exemplary embodiment of the present invention.

FIG. 9 is a diagram illustrating a MAC PDU structure newly defined according to an embodiment of the present invention.

Referring to FIG. 9, for example, if LF is 16 bits long, 2-bit paddings 1005, 1010 and 1015 are added to their associated MAC header elements.

When paddings are added to all MAC header elements constituting the MAC header, an occurrence frequency of padding bits is determined according to orders of the MAC header elements. For example, since the first MAC header element always exists, padding bits of the first MAC header element also always exist. However, the second MAC header element exists only when at least two MAC SDUs are multiplexed, and the third MAC header element exists only when at least three MAC SDUs are multiplexed.

Therefore, the present invention transmits the 'happy bit' for adjusting an uplink data rate after including it in the first MAC header element. By transmitting the 'happy bit' after including it in the first MAC header element, a UE helps a Node B perform fast uplink data scheduling.

Figure 10:
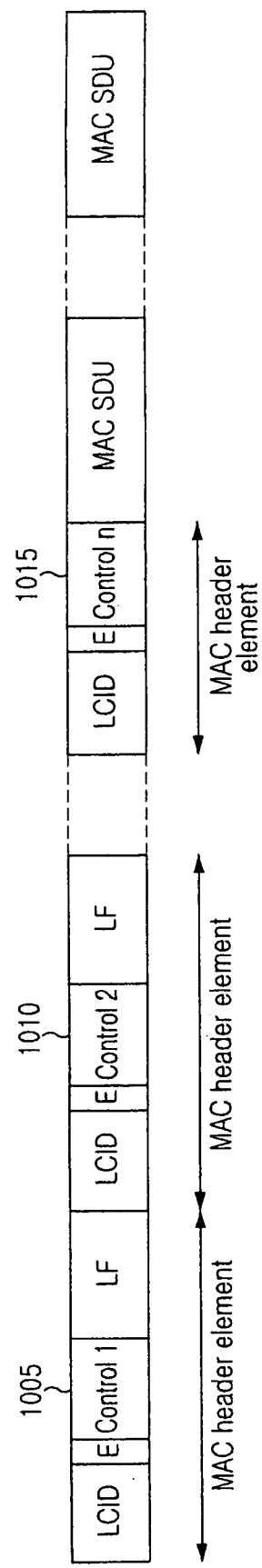
FIG. 10 is a diagram illustrating an example of a MAC PDU structure according to a fourth exemplary embodiment of the present invention.

FIG. 10 is a diagram illustrating an example of a MAC PDU structure according to the fourth exemplary embodiment of the present invention.

Referring to FIG. 10, the fourth exemplary embodiment of the present invention transmits specific control information after including it in the parts corresponding to padding bits in MAC header elements, and the type of the control information contained in the padding parts is indicated by orders of the MAC header elements.

That is, highest-priority control information is contained in the earlier MAC header element, and the lowest-priority control information is contained in the later MAC header element.

For example, according to the present invention, the 'happy bit' can be contained in a specific field of the first MAC header element, information indicating the top-priority information can be included in a specific field of the second MAC header element, information indicating the amount of the top-priority data can be contained in a specific field of the third MAC header element, information indicating the second highest-priority data can be contained in the fourth MAC header element, and information indicating the amount of the second highest-priority data can be contained in the fifth MAC header element.

Figure 11:
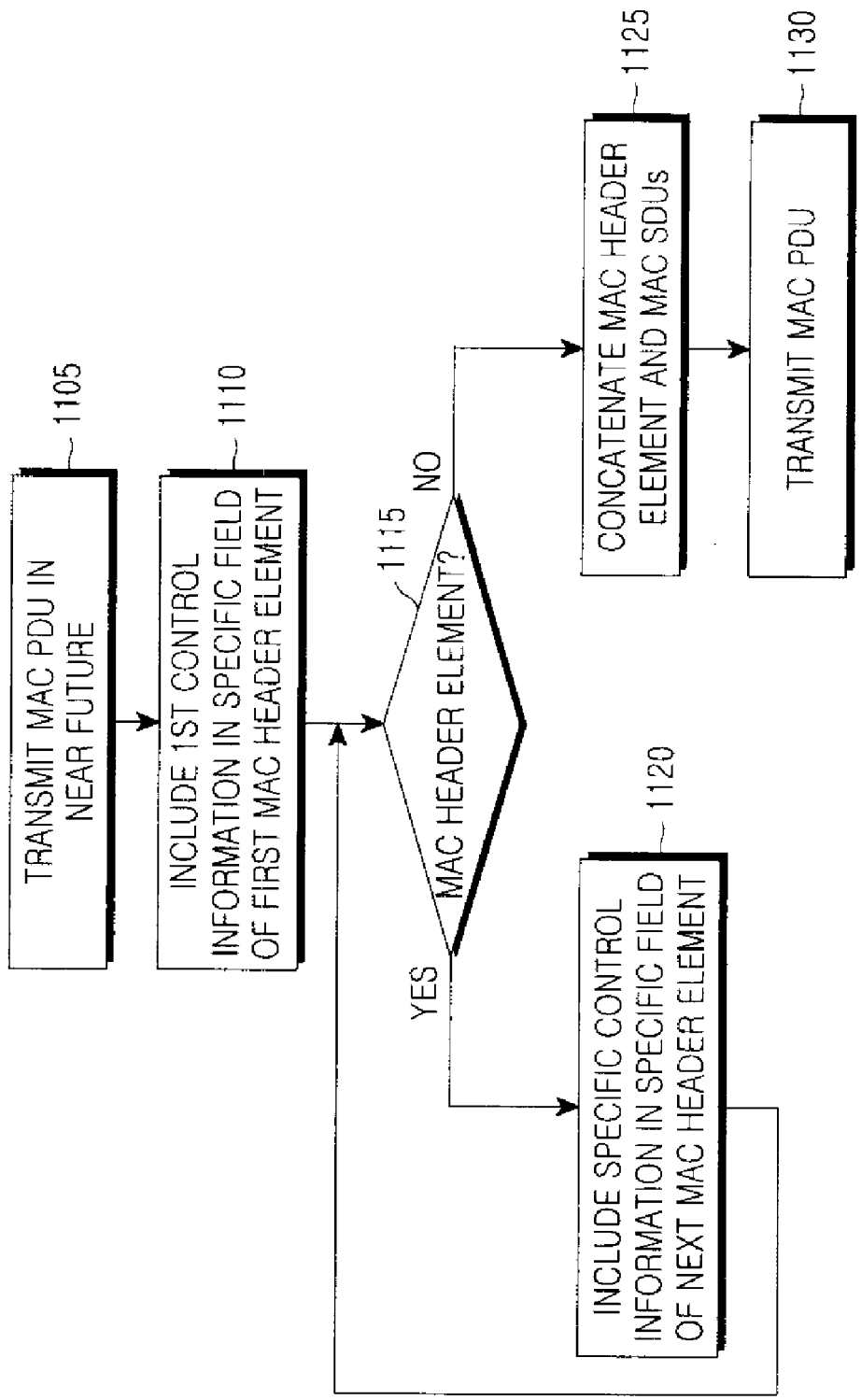
FIG. 11 is a flowchart illustrating an example of a UE's operation according to the fourth exemplary embodiment of the present invention.

FIG. 11 is a diagram illustrating a UE's operation according to the fourth exemplary embodiment of the present invention.

Referring to FIG. 11, in step 1105, the UE is allocated transmission resources from a Node B, and perceives a need to transmit a MAC PDU. Herein, the UE has already received from the Node B a notification indicating a relation between orders of MAC header elements and types of control information. The UE determines radio bearers for MAC SDUs to be multiplexed to a MAC PDU, a size of the MAC SDUs, and the number of MAC SDUs taking into account a size of the MAC PDU to be transmitted, the amount of data stored in each of the radio bearers, and priorities of the corresponding radio bearers. The UE starts generating MAC header elements to be contained in the MAC PDU.

In step 1110, the UE includes first control information, e.g., 'happy bit', in a specific field of the first MAC header element. In step 1115, the UE checks if all MAC header elements, the number of which corresponds to the determined number of MAC SDUs, have been generated. If not, the UE generates, in step 1120, the next MAC header element, generates control information corresponding to an order of the next MAC header element, and includes it therein.

However, if there is no more MAC header element to generate, the UE proceeds to step 1125 where it concatenates the generated MAC header elements to MAC SDUs, generating a MAC PDU. In step 1130, the UE transmits the generated MAC PDU to the Node B.

Figure 12:
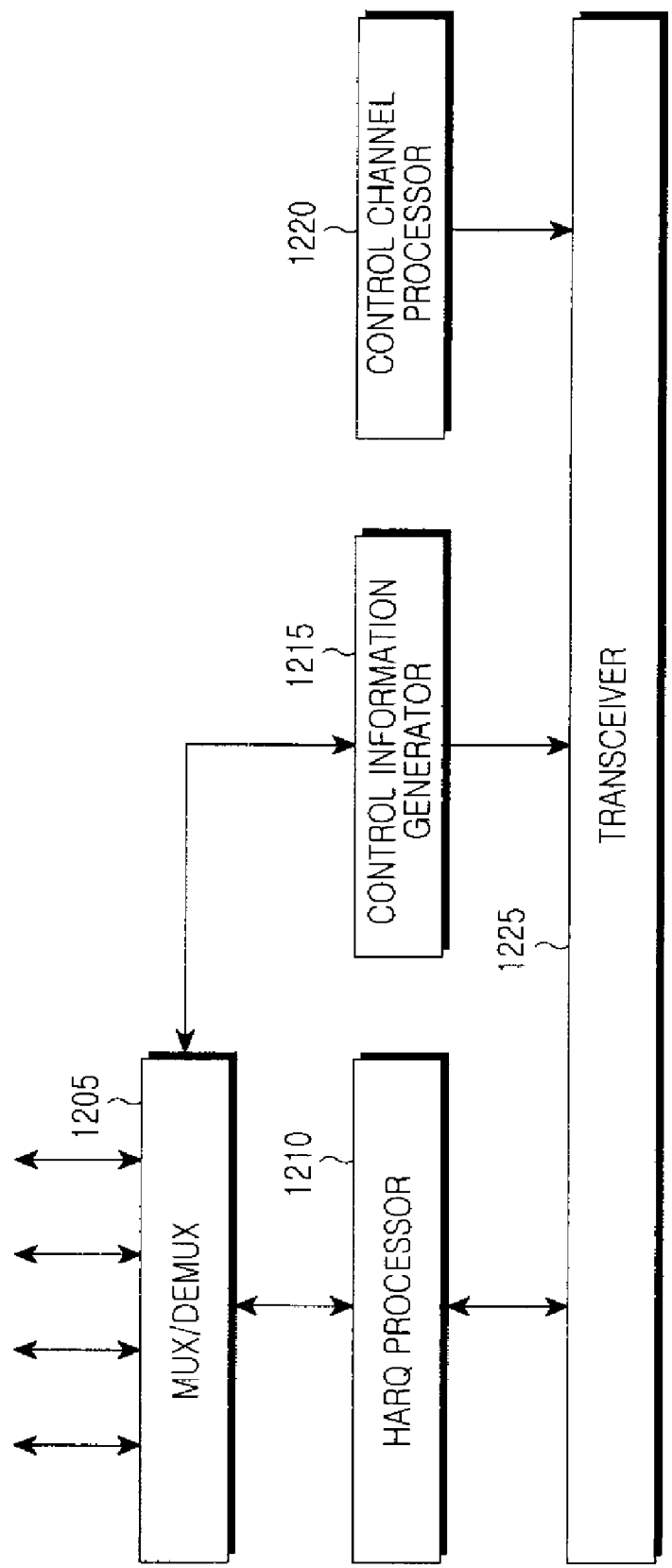
FIG. 12 is a block diagram of an example of a UE apparatus according to the fourth exemplary embodiment of the present invention.

FIG. 12 is an example of a block diagram of a UE apparatus according to the fourth exemplary embodiment of the present invention.

Referring to FIG. 12, the UE apparatus includes a multiplexing/demultiplexing device 1205, a HARQ processor 1210, a control information generator 1215, a control channel processor 1220, and a transceiver 1225.

The control information generator 1215 perceives a relation between orders of MAC header elements and types of control information, generates control information to be contained in the MAC header elements during MAC PDU transmission, and provides the control information to the multiplexing/demultiplexing device 1205. According to the present invention, the happy bit for adjusting uplink data rate is contained in the first MAC header element as it is regarded as control information.

The control channel processor 1220 is a device for processing downlink/uplink control channels. According to the present invention, the control channel processor 1220 generates a control channel with a 'happy bit', or generates SRCH with a 'happy bit', and provides it to the transceiver 1225. Further, the control channel processor 1220 receives a downlink control channel, and analyzes downlink control information to determine whether to perform scheduling.

The transceiver 1225 is a device for transmitting/receiving a MAC PDU over a wireless channel, or transmitting/receiving control information over a wireless channel. Further, the transceiver 1225 is a device for receiving HARQ packets.

The HARQ processor 1210 is a set of soft buffers formed to perform an HARQ operation, and is identified by an HARQ process identifier.

A fifth exemplary embodiment of the present invention provides a method for transmitting a two-bit 'happy bit' field after including it in a padding part 905 of the first MAC header element.

To set the two-bit 'happy bit' field, a UE uses Happy Bit Setting Rule 7.

Happy Bit Setting Rule 7

| Happy bit | Setting Rule |
| --- | --- |
| 0 | Power limit |
| 1 | TBS/TF_current < m0 |
| 2 | m0 ≤ TBS/TF_current < m1 |
| 3 | m1 ≤ TBS/TF_current |

The UE, when it is allocated uplink transmission resources, determines its uplink transmission power taking into account a size of a packet to be transmitted, a Modulation & Coding Scheme (MCS) to be applied, and a path loss. If the path loss increases due to the UE's poor channel condition, the required uplink transmission power may exceed the UE's maximum transmission power. If the UE can satisfy the required transmission power even though it uses the maximum transmission power, the UE should notify it to the Node B so that the UE can transmit packets of a smaller size regardless of the amount of currently stored data.

Therefore, in the fifth exemplary embodiment of the present invention, if the required transmission power calculated using a given UE's channel condition or pass loss, the amount of allocated transmission resources, a size of a transmission packet, and an MCS level to be used for packet transmission, exceeds the UE's maximum transmission power, the UE notifies it using a specific code point (e.g. code point 0) of the 'happy bits'.

Figure 13:
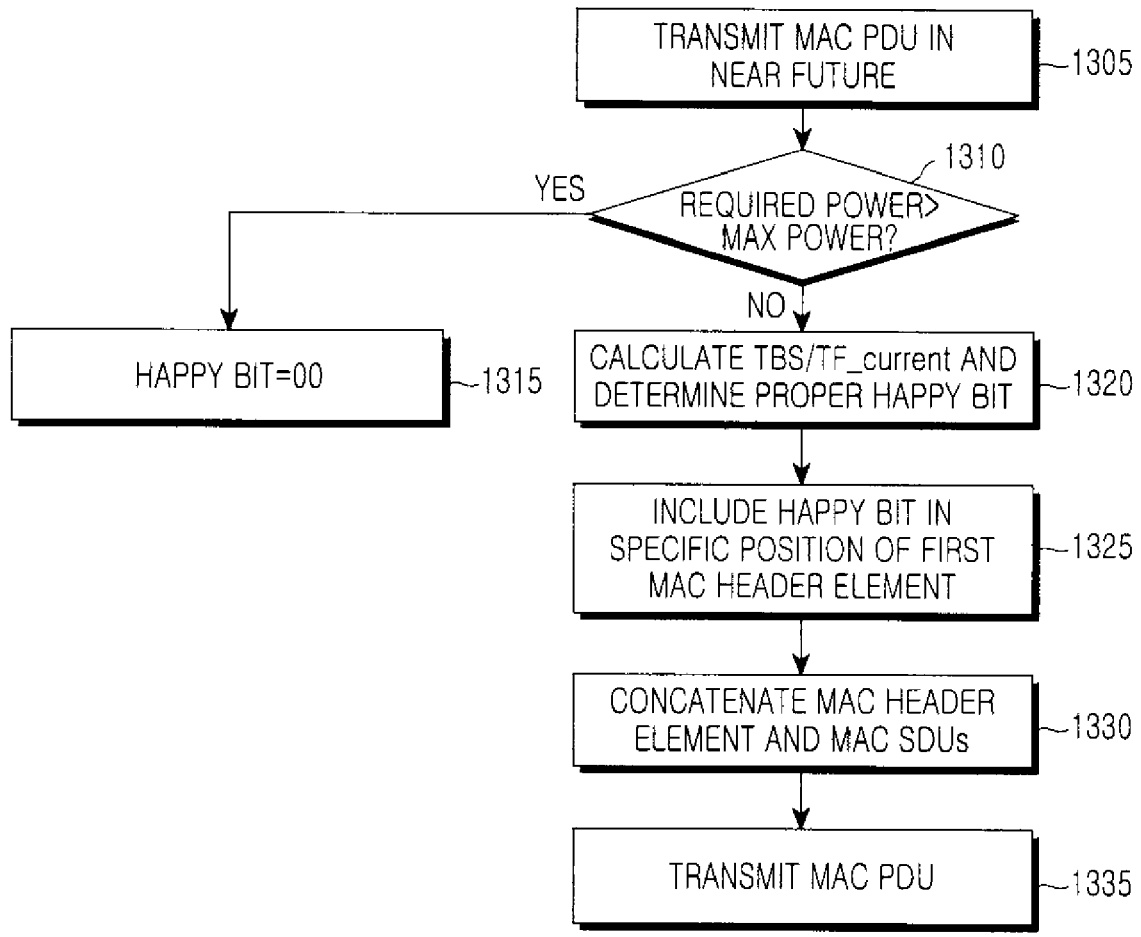
FIG. 13 is a control flowchart illustrating an example of an operation of transmitting a packet by a UE according to a fifth exemplary embodiment of the present invention.

FIG. 13 is an example of a control flowchart illustrating an operation of transmitting a packet by a UE according to the fifth exemplary embodiment of the present invention.

Referring to FIG. 13, in step 1305, the UE is allocated transmission resources from a Node B, and perceives a MAC PDU to be transmitted and a size of the MAC PDU. Herein, the UE has already received parameters m0 and m1 to be used for 'happy bit' setting, in the call setup process.

In step 1310, the UE calculates required transmission power necessary for transmission of the MAC PDU taking into account a size of the MAC PDU to be transmitted, an MCS level to be applied for the MAC PDU transmission, the amount of transmission resources over which it will transmit the MAC PDU, and the current path loss, and checks if the calculated required transmission power exceeds the maximum transmission power allowed for the UE.

If the required transmission power exceeds the maximum transmission power, the UE proceeds to step 1315 where it determines the 'happy bits' as, for example, '00' indicating 'arrival at transmission power limit'.

However, if the required transmission power does not exceed the maximum transmission power, the UE proceeds to step 1320 where it finds a ratio of the size of the MAC PDU to the amount of data stored in the buffer, and determines the 'happy bits'. For example, the UE finds a ratio of the size TF_current of a transmission MAC PDU to the total TBS of data currently stored in the UE's buffer, and determines the 'happy bits' as 01 for ratio<m0, the 'happy bits' as 10 for m0<ratio<m1, and the 'happy bits' as 11 for ratio>m1.

In step 1325, the UE includes the determined 'happy bits' in a specific field of the first MAC header element. A position where the 'happy bits' will be contained can be identical to the position of unused bits, or padding bits, in the MAC header element. The padding bits can be the last two bits of the MAC header element as illustrated in FIG. 9, or can be the first two bits of the MAC header element.

In step 1330, the UE concatenates MAC header elements containing happy bits, MAC header elements containing control information, and MAC SDUs, to generate a MAC PDU. In step 1335, the UE transmits the generated MAC PDU to the Node B.

A sixth exemplary embodiment of the present invention provides, as a detailed scheme of the fourth exemplary embodiment, a scheme of including control information in paddings of MAC header elements in the following order.

Types and Orders of Control Information Contained in Paddings of MAC Header Elements Padding of the first MAC header element: It contains information indicating the total buffer state of a UE.

Padding of the second MAC header element: It contains information indicating a buffer state of the highest-priority logical channel group.

Padding of the third MAC header element: It contains information indicating a buffer state of the second highest-priority logical channel group.

Padding of the fourth MAC header element: It contains information indicating a buffer state of the third highest-priority logical channel group.

Padding of the fifth MAC header element: It contains information indicating a buffer state of the fourth highest-priority logical channel group.

According to the present invention, a maximum of 4 logical channel groups can be set up. The logical channel groups are aimed to prevent the buffer state from being contained in a buffer state report message separately for each logical channel, thereby reducing a size of the buffer state report message. A mapping relation between logical channels and logical channel groups is dynamically determined in the logical channel setup process. Therefore, the number of logical channel groups for each UE can be different according to the properties of and the number of logical channels set up to the UE. Priority of a logical channel group corresponds to the highest one of the priorities of its logical channels.

Information indicating the UE's total buffer state and information indicating a buffer state of a logical channel group, as in the foregoing embodiments can be defined as a ratio of the current TF and the total of data stored in the corresponding buffer.

As is apparent from the foregoing description, according to the present invention, the UE sends an adjustment request for its uplink data rate to the Node B over SRCH according to the empty state or the non-empty state, so that it can request adjustment of the uplink data rate and can be allocated resources even without a separate uplink control channel associated with a data transmission channel.

While the invention has been shown and described with reference to a certain exemplary embodiment thereof, it will be understood by those skilled in the art that various changes in form and details may be made therein without departing from the spirit and scope of the invention as defined by the appended claims.

What is claimed is:

1. A method for adjusting an uplink data rate by a User Equipment (UE) in a mobile communication system, the method comprising:
   determining if a current state of a buffer is an empty state or a non-empty state;
   when the current buffer state is the non-empty state, comparing a ratio of a total of transmission data currently stored in the buffer to a total of Transport Formats (TFs) allocated during a predetermined number n of subframes, with a predetermined threshold;
   setting indication information indicating satisfaction/non-satisfaction of an uplink data rate according to the compared ratio with the predetermined threshold; and
   transmitting the set indication information to a Node B.

2. The method of claim 1, wherein comparing comprises comparing a ratio of a last buffer size reported to a total buffer size with the predetermined threshold.

3. The method of claim 1, wherein the set indication information is transmitted to the Node B over a Scheduling Request Channel (SRCH).

4. The method of claim 1, wherein the set indication information is transmitted to the Node B through a header of uplink data.

5. The method of claim 1, wherein the set indication information is set in padding bits of a first header element of a header of uplink data, and transmitted to the Node B.

6. The method of claim 5, wherein the header of the uplink data is generated to include at least two header elements, and is generated to sequentially include therein information indicating a buffer state of each logical channel group according to priorities of a plurality of logical channel groups.

7. The method of claim 6, wherein the priority is set as a ratio of a total of transmission data stored in the buffer to a total of TFs of transmission data for each logical channel group.

8. The method of claim 1, wherein the set indication information is set depending on a Hybrid Automatic Repeat reQuest (HARQ) delay.

9. The method of claim 1, wherein the set indication information is set depending on a maximum transmission power of the UE.

10. The method of claim 1, wherein the set indication information is set with at least one bit.

11. A User Equipment (UE) apparatus for adjusting an uplink data rate in a mobile communication system, comprising:
    a controller to determine if a current state of a buffer is an empty state or a non-empty state, to compare, when the current buffer state is the non-empty state, a ratio of a total of transmission data currently stored in the buffer to a total of Transport Formats (TFs) allocated during a predetermined number n of subframes, with a predetermined threshold, and to set indication information indicating satisfaction/non-satisfaction of an uplink data rate according to the compared ratio with the predetermined threshold; and a transceiver to transmit the set indication information to a Node B.

12. The UE apparatus of claim 10, wherein the controller is configured to compare a ratio of a last buffer size reported to a total buffer size with the predetermined threshold.

13. The UE apparatus of claim 10, further comprising:
a Scheduling Request Channel (SRCH) processor to transmit the set indication information to the Node B over SRCH.

14. The UE apparatus of claim 10, further comprising:
a control channel processor to transmit the set indication information to the Node B through a header of uplink data.

15. The UE apparatus of claim 14, wherein the control channel processor is further configured to first insert the set indication information into padding bits of a first header element of the header of the uplink data, and then to transmit the uplink data to the Node B.

16. The UE apparatus of claim 10, wherein the controller is further configured to set the indication information depending on a Hybrid Automatic Repeat reQuest (HARQ) delay.

17. The UE apparatus of claim 10, wherein the controller is further configured to set the indication information depending on a maximum transmission power of the UE apparatus.

18. The UE apparatus of claim 10, wherein the controller is further configured to set the indication information with at least one bit.

* * * * *